United States Patent [19]
Yoda et al.

[11] Patent Number: 4,752,456
[45] Date of Patent: Jun. 21, 1988

[54] PROCESS FOR PREPARING METAL CARBIDES AND PRECURSORS THEREOF

[75] Inventors: Yukihiro Yoda; Makoto Horita; Kensaku Maruyama; Hideaki Miyashita; Norihiro Murakawa, all of Shimonoseki; Kazuyoshi Isogaya, Tokyo; Fumio Nakamura; Norimasa Kawamura, both of Shimonoseki; Noriaki Kuramitsu, Miura, all of Japan

[73] Assignee: Mitsui Toatsu Chemicals, Inc., Chiyoda, Japan

[21] Appl. No.: 886,768

[22] PCT Filed: Jun. 1, 1983

[86] PCT No.: PCT/JP83/00180

§ 371 Date: Jan. 27, 1984

§ 102(e) Date: Jan. 27, 1984

[87] PCT Pub. No.: WO83/04188

PCT Pub. Date: Dec. 8, 1983

Related U.S. Application Data

[63] Continuation of Ser. No. 584,938, Jan. 27, 1984, abandoned.

[30] Foreign Application Priority Data

| Jun. 1, 1982 [JP] | Japan | 57-92215 |
| Sep. 14, 1982 [JP] | Japan | 57-158786 |
| Sep. 16, 1982 [JP] | Japan | 57-159516 |
| Nov. 4, 1982 [JP] | Japan | 57-192526 |
| Dec. 3, 1982 [JP] | Japan | 57-211377 |
| Dec. 27, 1982 [JP] | Japan | 57-227040 |

[51] Int. Cl.$^4$ ............ C01B 31/30; C01B 31/34; C01B 31/36; C04B 35/52

[52] U.S. Cl. .............. 423/291; 252/183.14; 423/345; 423/346; 423/439; 423/440; 423/442; 501/87; 502/177; 502/182

[58] Field of Search ............ 423/291, 345, 346, 439, 423/440, 453, 440 (U.S. only); 501/87; 502/177, 182; 252/188.31

[56] References Cited

U.S. PATENT DOCUMENTS

| 1,868,921 | 7/1932 | Schmidt et al. | 423/453 |
| 3,077,385 | 2/1963 | Robb | 423/440 |
| 3,123,567 | 3/1964 | Ruelle et al. | 502/182 |
| 3,340,020 | 9/1967 | Neuewschwawder et al. | 423/440 |
| 3,383,175 | 5/1968 | Jordan et al. | 423/453 |
| 3,812,239 | 5/1974 | Swany | 423/440 |
| 3,839,542 | 10/1974 | Chase | 423/291 |
| 4,080,431 | 3/1978 | Moss | 423/440 |
| 4,364,974 | 12/1982 | Lask | 423/345 |
| 4,622,215 | 11/1986 | Janey | 423/440 |

FOREIGN PATENT DOCUMENTS 1238346 7/1971 United Kingdom ............... 423/453

*Primary Examiner*—Gary P. Straub
*Attorney, Agent, or Firm*—Scully, Scott, Murphy & Presser

[57] ABSTRACT

A carbon-containing mixture is obtained by collecting a dispersed phase mixture from an aerosol which has been formed by introducing a decomposable carbon compound and a decomposable metallic compound into a hot gas containing steam.

Since this carbon-containing mixture is extremely high in uniformity and consists of extremely fine particles, it can afford after heat treatment a metal carbide of high quality.

8 Claims, 1 Drawing Sheet

PROCESS FOR PREPARING METAL CARBIDES AND PRECURSORS THEREOF

This application is a continuation of application Ser. No. 584,938 filed Jan. 27, 1984, now abandoned.

FIELD OF ART

The present invention relates to a process for preparing metal carbides and precursors thereof. More particularly, it is concerned with a process for preparing novel carbon-containing mixtures and metal carbides obtained therethrough.

BACKGROUND ART

Sintered metal carbides such as sintered silicon carbide are known to have superior characteristics as ceramic materials, etc.

Heretofore, metal carbides have been produced mainly by reacting metal elements or metal oxides and carbon under a strong heat. For example, a method in which one or more of, for example, such metal elements as silicon, titanium, tungsten, boron, aluminum, zirconium, hafnium, niobium, cobalt, molybdenum, tantalum, chromium and vanadium, or of oxides of these metals, and carbon are mixed and reacted under a strong heat, has already been practiced on an industrial scale. In this industrial method, the said mixture as it is, or together with an inert gas, e.g. argon or helium, is heated by using a high-frequency heating furnace, an Acheson type direct electric resistance furnace, or the like, to allow a reducing reaction and a carburizing reaction to take place, whereby there are obtained powdered metal carbides according to the starting materials used, e.g. SiC, TiC, WC, $B_4C$, ZrC, HfC, NbC, $Mo_2C$, TaC, $Cr_3C_2$, VC, (SiTi)C, (WTi)C, (MoW)C, (WTiTaNb)C.

The thus obtained powders of metal carbides have a characteristic such that the finer the powders, the higher the strength of moldings obtained by subsequent sintering and the higher the sintering rate. This inevitably requires that the mixture of metal element or metal oxide and carbon, as an intermediate material, be of uniform and fine particles. In this connection, according to the prior art, the mixture in question is produced usually by pulverizing and mixing a coarse-grained or agglomerated metal element or metal oxide and carbon mechanically simultaneously and batchwise by means of a ball mill, a hammer mill, or the like. In this method, however, not only the material charging and product carrying out operations are troublesome because of the batch process, but also problems associated with working environment such as the formation of dust and the generation of noise during the pulverizing and mixing operation are unavoidable. Moreover, the mechanical pulverization requires a long time for obtaining a finely divided powder, and this long-time pulverization inevitably results in an increased amount of impurities incorporated which is ascribable to wear of the pulverizing machine itself, which in turn requires an impurity removing step as an after step such as chemical washing or adsorption. Because of these problems, it is next to impossible for the mechanical method to afford a finely divided mixture of below one micron.

There has also been known a method in which fine powders which have separately been obtained in advance by some suitable means are mixed together by using a mixer, a kneader, or the like. Even according to this method, however, biasing in the contents of the resultant mixture is unavoidable due to the difference in particle size, orientating property and specific gravity peculiar to each powder. In an effort to remedy this drawback, there has further been proposed a method in which a fine powder is dispersed in water in the form of colloid by means of a wet vibration mill or the like and then spray-dried by using a spray drier or the like. However, even according to this method, biasing in the mixed contents is apt to occur, and there is a fundamental problem such that because silicon oxide powder, titanium oxide powder and carbon powder which are aggregates with each individual particle being incapable of separating easily remain as aggregates as they are, it is difficult for them to constitute a mixture consisting of individual particles. Further, also from economic aspects such as equipment and energy costs, such conventional method is not desirable because it goes through fine powder manufacturing, wet mixing and spray drying steps.

On the other hand, as another method for obtaining metal carbides, U.S. Pat. No. 3,839,542 discloses a method of producing finely divided metal carbides directly by a vapor phase reaction from halides of metals such as boron, silicon, titanium, zirconium, hafnium, vanadium, tantalum, niobium, molybdenum, tungsten and thorium, and hydrocarbons in the presence of hydrogen. But this method cannot be considered economical in that it uses plasma for heating and requires both a large amount of hydrogen gas and a temperature of at least 1,300° C.

Furthermore, in Japanese Patent Publication No. 36122/1981 there is disclosed a method of producing metal carbides directly by a vapor phase reaction from halides of metals selected from Group III through V metals of the Periodic Table, a carbon source and an anhydrous hydrogen halide. But this method cannot be considered economical, either, in that it requires both a large amount of hydrogen gas and the supply of an anhydrous hydrogen halide.

In the method of producing metal carbides directly by a vapor phase reaction according to the above-described prior arts, problems are also encountered in that the presence of oxygen and steam impedes the production of metal carbides, thus requiring control of the atmosphere and in that not a small quantity of metal halide vaporizes in gaseous state to the exterior of the reaction system.

It is the object of the present invention to overcome the above-mentioned problems of the prior art methods.

More particularly, the object of the present invention is to provide a process for once obtained a carbon-containing mixture as a precursor of metal carbide which mixture is extremely high in uniformity and consists of extremely fine particles, and thereafter obtaining a metal carbide of high quality by heat-treating the carbon-containing mixture.

DISCLOSURE OF THE INVENTION

According to the present invention, first a mixture of dispersed phases is collected from an aerosol of carbon element and an aerosol of metal oxide or metal element, to obtain a carbon-containing mixture. In this case, the aerosol of carbon element and that of metal oxide or metal element may be prepared separately. But preferably, a mixed aerosol containing both carbon element and metal oxide or metal element is formed by charging a decomposable carbon compound and a decomposable metallic compound, preferably simultaneously, into a hot gas. As the hot gas it is desirable to use a steam-containing hot gas, and in this case the decomposable metallic compound is converted to a metal oxide.

Then, the carbon-containing mixture obtained by collecting the dispersed phases from the aerosols or the mixed disperse phase from the mixed aerosol is heat-treated to produce a metal carbide.

In this case, if the formula weight ratio of carbon (C) to metal (M), i.e. C/M, in the carbon-containing mixture is larger than 3, there will be obtained a finer powder of metal carbide. Preferably, for obtaining a finely divided metal carbide powder, a carbon-containing mixture having a formula weight ratio C/M of larger than 3 is heat-treated in a compressed state of not less than 0.15 g/cc in terms of bulk density. By heat-treating the carbon-containing mixture in a state of not more than 0.2 g/cc in terms of its bulk density, it is possible to produce a metal carbide whisker.

The metal carbide powder is then converted to a sintered product by a conventional method.

BEST FORM FOR PRACTISING THE INVENTION

Figure 1:
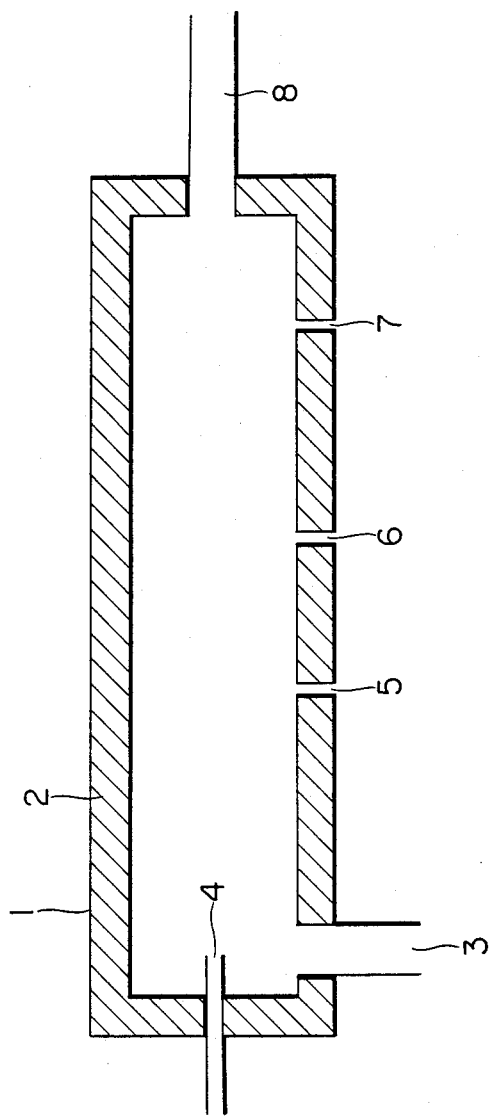
FIG. 1 is a sectional view showing an example of a mixing furnace for producing a carbon-containing mixture, in which the numeral 1 denotes a furnace body, 2 a duct, 3 a burner, 4 a nozzle, and 5 a duct.

As the decomposable carbon compound fed into the hot gas for producing the carbon-containing mixture in the invention, essentially there may be used any carbon-containing compound capable of being decomposed into carbon. But, hydrocarbons, halogenated hydrocarbons and halogenated carbons which normally assume a gaseous or liquid phase or are capable of being easily changed to a liquid phase on heating, are preferred. Examples of hydrocarbons include petrochemical products such as methanol, ethanol, acetone, n-hexane, benzene and xylene, as well as petroleum such as naphtha, propane, light oil, kerosene and heavy oil. Even refining residues such as petroleum pitch, methyl oil, anthracene oil and creosote as well as petrochemical residues such as $C_9$ fraction mixture and ethylene bottom are also employable. Examples of halogenated hydrocarbons include chloroform, vinyl chloride and chlorobenzene. And carbon tetrachloride may be mentioned as an example of halogenated carbon.

Among the above-enumerated carbon compounds, particularly preferred are toluene, xylene, benzene, kerosene, light oil, heavy oil, $C_9$ fraction mixture and ethylene bottom, from the aspects of easy handling and carbon yield.

As the decomposable metallic compound, there essentially may be used any metallic compound provided it can be converted to metal oxide or metal element on heating in the presence or absence of steam. For example, there may be used halides, alkylated compounds, alkoxides and acid esterified compounds of the following metals provided those compounds easily undergo thermal decomposition, oxidation or hydrolysis: Group I-A metals such as lithium, sodium, potassium, rubidium and cesium; Group II-A metals such as beryllium, magnesium, calcium, strontium and barium; Group IV-A metals such as titanium, zirconium and hafnium; Group V-A metals such as vanadium, niobium and tantalum; Group VI-A metals such as chromium, molybdenum and tungsten; Group VII-A metals such as manganese, technetium and rhenium; iron family metals such as iron, ruthenium and osmium; cobalt family metals such as cobalt, rhodium and iridium; nickel family metals such as nickel and palladium; Group I-B metals such as copper, silver and gold; Group II-B metals such as zinc, cadmium and mercury; Group III-B metals such as boron, aluminum, gallium and indium; Group IV-B metals such as silicon, germanium, tin and lead; Group V-B metals such as phosphorus, arsenic, antimony and bismuth; Group VI-B metals such as sulfur, selenium and tellurium; and rare earth metals such as cerium, praseodymium, neodymium, thorium and uranium. The following are examples of such metallic compounds, which may be used each alone or in combination: $C_5H_{11}Li$, $C_3H_5Li$, $C_5H_5Li$, $LiH$, $LiCl$, $NaH$, $C_2H_5Na$, $C_5H_5Na$, $C_6H_5C_2Rb$, $C_6H_5CH_2Rb$, $C_2H_5Cs$, $C_6H_5C_2Cs$, $BeCl_2$, $BeI_2$, $CH_3BeBr$, $(C_2H_5)_2Be$, $(CH_3)_2Be$, $MgCl_2$, $MgBr_2$, $C_3H_5MgCl$, $(CH_3)_2Mg$, $Mg(OCH_3)_2$, $Mg(OC_2H_5)_2$, $(C_5H_5)_2Ca$, $CaCl_2$, $CaH_2$, $CaBr_2$, $Sc(C_5H_7O_2)_3$, $Sc(CH_3)_3$, $Y(CH_3COO)_3$, $Y(CH_3)_3$, $Y(C_5H_5)_3$, $LaCl_3$, $La(C_5H_7O_2)_3$, $La(CH_3)_3$, $La(C_5H_5)_3$, $TiCl_4$, $TiCl_3CH_3$, $TiCl_3(C_5H_5)$, $TiF_4$, $TiCl_3$, $TiBr_4$, $TiI_4$, $Ti(C_5H_5)_2$, $ZrBr_4$, $ZrCl_4$, $ZrI_4$, $ZrCl_2O$, $ZrH_2(C_5H_5)_2$, $Zr(OC_3H_7)_4$, $HfCl_4$, $Hf(C_3H_5)_4$, $HfCl_2(C_5)_2$, $VF_4$, $VF_5$, $VCl_3$, $VCl_4$, $VCl_5$, $VCl_3O$, $VClO_2$, $V(C_5H_5)_2$, $V(C_6H_6)_2$, $V(CO)_6$, $NbF_5$, $NbCl_4$, $NbCl_5$, $NbBr_5$, $Nb(C_3H_5)_4$, $NbH_3(C_5H_5)_2$, $TaF_5$, $TaCl_4$, $TaCl_5$, $TaBr_4$, $TaCl_2(CH_3)_3$, $TaH_3(C_5H_5)_2$, $Ta(OC_2H_5)_5$, $CrCl_4$, $CrO_2Cl_2$, $Cr(CH_3)_4$, $Cr_2(C_3H_5)_4$, $MoF_5$, $MoF_6$, $MoCl_5$, $MoCl_4O$, $MoCl_2(C_5H_5)_2$, $MoH_2(C_5H_5)_2$, $WF_6$, $WCl_2$, $WCl_4$, $WCl_5$, $WCl_6$, $W(CH_3)_6$, $WH_2(C_5H_5)_2$, $WCl_2(C_5H_8)_2$, $MnCl_2$, $Mn(C_5H_5)_2$, $TcH(C_5H_5)_2$, $ReH(C_5H_5)_2$, $FeCl_2$, $Fe(CH_3COO)_2$, $FeCO(C_4H_6)_2$, $Ru(C_5H_5)_2$, $CoCl_2$, $Co(ClO_4)_2$, $CoF_3$, $Co_2(CO)_8$, $Co(C_5H_5)$ -$(C_6H_8)$, $Co(CO)_2C_5H_5$, $Co(C_3H_5)_3$, $RhCl_3$, $Rh(C_5H_5)$ $(C_5H_6)$, $[IrCl(C_8H_{14})_2]_2$, $Ni(CO)_4$, $Ni(C_3H_5)_2$, $Ni(C_5H_5)_2$, $Pd(C_3H_5)(C_5H_5)$, $CaF_2$, $CaCH_3$, $CaC_3H_5$, $ZnH_2$, $Zn(C_2H_3)_2$, $Cd(CH_3)_2$, $Cd(C_2H_3)_2$, $HgF_2$, $Hg(CH_3)_2$, $BF_3$, $BCl_3$, $BBr_3$, $B_2H_6$, $B(CH_3)_3$, $CH_3B(OH)_2$, $AlH_3$, $(C_2H_5)_3Al$, $Al(OCH_3)_3$, $Al(OC_2H_5)_3$, $Al(OC_3H_7)_3$, $AlCl_3$, $GaCl_3$, $Ga(CH_3)_3$, $Ca(C_6H_5)_3$, $(C_2H_5)_2GaOC_2H_5$, $InCl_2$, $TlF_3$, $TlCl$, $Tl(CH_3)_3$, $SiH_4$, $Si_2H_6$, $SiCl_4$, $SiF_4$, $(CH_3)_2SiCl_2$, $CH_3SiCl_3$, $(CH_3)_4Si$, $(C_2H_5)_4Si$, $GeCl_2$, $GeCl_4$, $(CH_3)_4Ge$, $SnF_2$, $Sn_2Cl(OH)_3$, $Sn(CH_3)_4$, $PbF_4$, $PbCl_4$, $(C_4H_9)_4Pb$, $PCl_3$, $PH_3$, $AsF_3$, $AsH_3$, $AsF_5$, $AsCl_3$, $SbF_5$, $SbCl_5$, $BiF_5$, $BiCl_3$, $BiH_3$, $H_2Se$, $CeCl_4$, $CeCl_3$, $Ce(C_5H_5)_3$, $PrCl_3$, $NbCl_3$, $SmCl_3$, $EuCl_3$, $ThCl_4$, $VF_6$, $VCl_6$.

Among the above-enumerated compounds are included those which are solid at room temperature. But even those compounds are employable provided they are beforehand heated up to temperatures required for their melting or dissolved in solvent. As the solvent, there may be used water, inorganic acids and aqueous alkali solutions, but volatile solvents such as methanol, ethanol, toluene, xylene, n-hexane and carbon tetrachloride are easier to use.

As described above, a wide variety of metals are employable as the metal component of the metallic compound, but silicon, titanium, tungsten, boron, aluminum, zirconium, hafnium, niobium, molybdenum, tantalum, chromium and vanadium are preferred in that they can finally afford ceramic materials superior in heat- and corrosion resistance, with silicon being especially preferred. Examples of decomposable compounds of these metals include $SiCl_4$, $SiF_4$, $SiH_4$, $HSiCl_3$, $CH_3SiCl_3$, $(CH_3)_2SiCl_2$, $Si(OC_2H_5)_4$, $TiF_4$, $WCl_2$, $WCl_5$, $WCl_6$, $BF_3$, $BCl_3$, $B_2H_6$, $AlCl_3$, $Al(OCH_3)_3$, $Al(OC_2H_5)_3$, $Al(OC_3H_7)_3$, $ZrCl_4$, $ZrCl_2O$, $ZrBr_4$, $Zr(OC_3H_7)_4$, $HfCl_4$, $NbCl_4$, $MoCl_5$, $TaCl_4$, $Ta(OC_2H_5)_5$, $CrCl_4$, $CrO_2Cl_2$, and $VCl_4$.

Preferred silicon compounds are those of the following general formula: $Si_nX_{2n+2}$ wherein n is an integer of 1 to 4 and X is hydrogen, halogen, alkyl or alkoxy.

In supplying the above-exemplified decomposable carbon compound and metallic compound, preferably simultaneously, into the hot gas, there is used a furnace. As the furnace, there preferably is used a refractory-surrounded apparatus equipped with a heating unit such as a burner or an electric heater, a metallic compound and carbon compound supply nozzle, a gas supply duct and a mixed aerosol discharge duct.

Within the furnace used in the invention there must be a spatial region held at a temperature of at least 700° C., at which temperature there are obtained metal element and carbon element from the metallic compound and the carbon compound, respectively, and there is formed a mixed aerosol state as a gas-solid mixture. Even if a metal element, a metal hydroxide and a metal halide are present in addition to metal oxide, they are not an obstacle to the final object of the invention, namely, the production of a metal carbide, etc. The maxium temperature in the furnace is not specially limited. Usually, an intra-furnace temperature not higher than 1,500° C. suffices.

The steam-containing hot gas can be obtained by introducing steam into a hot gas which has been obtained by the electric heating method, high-frequency heating method or electric discharge method. But a simpler method is to burn with air a combustible material which produces steam on burning, such as hydrogen, methane, ethane, propane or the starting hydrocarbon. The latter method is advantageous from the aspect of equipment structure and more economic from the aspect of thermal efficiency.

The metallic compound used in working the invention has not only the property of changing into a solid matter of metal element upon its thermal decomposition reaction in the hot gas but also the property of changing into a solid matter of metal oxide or metal hydroxide upon its hydrolysis reaction with steam. Therefore, in an atmosphere wherein are present both heat and steam, it is possible to present the metallic compound from vaporizing in a gaseous state to the exterior of the reaction system.

The mixed aerosol in the hot gas is conducted to the exterior of the furnace and then the solid matter contained therein, namely, the dispersed phase, is collected by a collecting device such as bag filter, a cyclone, an electric precipitator, or the like. For diminishing the heat load of the collecting device, it is preferable that the mixed aerosol be cooled in advance. The cooling may be effected by zone cooling after reaction or by pouring of water. In this way, the carbon-containing mixture is collected.

In the present invention, it is desirable to control the weight ratio of the starting carbon compound to metallic compound so that the formula weight ratio C/M in the collected carbon-containing mixture is larger than 3. By so doing, the average particle diameter of the metal carbide obtained by heat-treating the carbon-containing mixture can be made smaller. But a too large value of this ratio would lead to loss of the carbon compound. Usually, 3 to 10, especially 3.5 to 8, are preferred.

By heat-treating the thus obtained carbon-containing mixture, there is obtained a metal carbide. The heat treatment is usually effected by heating heavily the carbon-containing mixture in vacuo or in an inert gas atmosphere by using a furnace such as, for example, an Acheson type direct electric resistance furnace or a high-frequency heating furnace. A preferred range of the heating temperature is from about 1,300° to 2,400° C. There can remain a solid carbon after the ignition, which, however, can be burnt off by heating in air at 400° to 1,000° C.

In the heat treatment for obtaining a metal carbide, if the carbon-containing mixture is heat-treated in a compressed state of not less than 0.15 g/cc in terms of its bulk density, there can be obtained a fine spherical powder of metal carbide having a uniform average particle diameter. The compression may be effected by any suitable means, for example, a mere compressing or granulation under stirring.

On the other hand, by heat-treating the carbon-containing mixture in a state not higher than 0.2 g/cc, preferbly below 0.15 g/cc, in terms of its bulk density, there can be obtained a metal carbide in the form of whisker. Metal carbide whisker, for example, silicon carbide whisker, can be utilized as a reinforcing agent for metals, ceramics, etc. by being added directly thereto.

The metal carbide powder is then sintered integrally in known manner to obtain a sintered metal carbide.

As the metal component of the metal carbide obtained in the present invention, there may be used two or more metals in combination. This combined use often affords better results. As an example, mention may be made of a combined use of silicon and boron. For example, a decomposable silicon compound such as silicon tetrachloride and a decomposable boron compound such as boron trichloride are fed into the steam-containing hot gas together with the decomposable carbon compound, followed by collection of the carbon-containing mixture, heat treatment and sintering in the manner as previously described, whereby there can be obtained a sintered product of high density and high quality. In this case, it is desirable to use the two so that the weight ratio of boron to silicon is 0.15~4.5:100.

As set forth hereinabove, since the present invention adopts the method of obtaining the carbon-containing mixture as a metal carbide precursor from aerosol, the carbon-containing mixture is uniform and finely divided and capable of being easily converted to a metal carbide having superior characteristics. Besides, the operations are easy, and there is no likelihood of entry of impurity. Thus, various outstanding effects are attainable.

The following examples are given to further illustrate the invention.

EXAMPLE 1

Using the reaction furnace (300 mm dia. by 3 m long) shown in FIG. 1, air was introduced through duct (3) continuously at a rate of 100 $Nm^3/h$, while propane gas was fed from burner (4) at a rate of 3 $Nm^3/h$ and allowed to burn, to form a high-temperature gas stream at 1,600–1,800° C. Then, $SiCl_4$ as a silicon compound and heavy oil A as a hydrocarbon were fed respectively through nozzles (5) and (6) at rates of 20 kg/h and 25 kg/h and 25 kg/h, while water was fed through nozzle (7) at a rate of 55 l/h, and the dispersed phase in the resultant aerosol was collected by means of a bag filter. In the collected mixture, a siliceous substance was identified as silicon dioxide by a chemical analysis, and the formula weight ratio (C/Si) of carbon to silicon proved to be 7.5 by the oxidative gravimetric method.

The collected mixture was heated at 1,800° C. for 2 hours in a nitrogen gas atmosphere by using a high-frequency heating furnace, then once cooled and thereafter heated to 800° C. in air to burn off the remaining carbon, yielding about 1.5 kg. of a finely divided silicon carbide powder. This silicon carbide powder was measured for specific surface area (the measurement of specific surface area was performed according to the BET method utilizing nitrogen gas adsorption), which proved to be 9.8 $m^2/g$. And its crystal form was found to be an α-form by the powder X-ray diffraction method.

EXAMPLE 2

In just the same way as in Example 1 except that $SiCl_4$ and heavy oil A were fed at rates of 10 kg/h and 15 kg/h, respectively, there was obtained a collected mixture having a formula weight ratio (C/Si) of 8.1 from which was obtained about 2 kg. of silicon carbide powder, which proved to have a specific surface area of 15.1 $m^2/g$ and the same crystal form as that in Example.

EXAMPLE 3

In just the same way as in Example 1 except that ethylene bottom was used as a hydrocarbon (fed at a rate of 15 kg/h), there was obtained a collected mixture having a formula weight ratio (C/Si) of 8.6, from which was obtained about 1.2 kg. of silicon carbide powder, which proved to have a specific surface area of 18.6 $m^2/g$ and an cyrstal form.

EXAMPLE 4

In just the same way as in Example 3 except that $CH_3SiCl_3$ was used a silicon compound (fed at a rate of 7 kg/h), there was obtained a collected mixture having a formula weight ratio (C/Si) of 14.1, from which was obtained about 1 kg. of silicon carbide powder, which proved to have a specific surface area of 14.1 $m^2/g$ and an crystal form.

COMPARATIVE EXAMPLE 1

$SiO_2$ powder (specific surface area: 198.5 $m^2/g$) and carbon powder (specific surface area: 120.4 $m^2/g$) were mixed at formula weight ratio (C/Si) of 10 for 5 hours by means of a ball mill, then the resultant mixture was heated at 1,800° C. for 2 hours in a nitrogen gas atmosphere by using a high-frequency heating furnace, then cooled and thereafter heated to 800° C. to burn off the remaining carbon, yielding about 1 kg. of silicon carbide powder. (This method is the prior art method.)

Although the $SiO_2$ and the carbon were each used in the form of a finely divided powder, the specific surface area of the silicon carbide powder obtained was as small as 1.1 $m^2/g$. This silicon carbide powder proved to have an α crystal form.

Results of the experiments described hereinabove are as summarized in Table 1 below.

TABLE 1

|  | Example | | | | Comparative |
|---|---|---|---|---|---|
|  | 1 | 2 | 3 | 4 | Example 1 |
| Air (Nm$^3$/h) | 100 | 100 | 100 | 100 |  |
| Hot gas source | 3 | 3 | 3 | 3 |  |

TABLE 1-continued

|  | Example | | | | Comparative |
|---|---|---|---|---|---|
|  | 1 | 2 | 3 | 4 | Example 1 |
| Propane gas (Nm$^3$/h) |  |  |  |  |  |
| Silicon compound |  |  |  |  |  |
| SiCl$_4$ (kg/h) | 20 | 10 | 10 | — |  |
| CH$_3$SiCl$_3$ (kg/h) | — | — | — | 7 |  |
| Hydrocarbon |  |  |  |  |  |
| Heavy oil A (kg/h) | 25 | 15 | — | — |  |
| Ethylene bottom (kg/h) | — | — | 15 | 15 |  |
| Formula weight ratio (C/Si) | 7.5 | 8.1 | 8.6 | 14.1 | 10 |
| Specific surface area of silicon carbide powder (m$^2$/g) | 9.8 | 15.1 | 18.6 | 35.6 | 1.1 |

EXAMPLE 5

Using the reaction mixing furnace (300 mm dia. by 3 mm long) shown in FIG. 1, air was fed through duct (2) at a rate of 75 Nm$^3$/H, propane as a hot air fuel was fed from burner (3) at a rate of 2 Nm$^3$/H, and a 1:2.32 (weight ratio) mixture of TiCl$_4$ as a metallic compound and xylene as a carbon compound was fed through nozzle (5) into the furnace at a rate of 8.01 kg/H. The interior of the furnace was held at about 1,500° C. in the position A of FIG. 1.

The aerosol formed in the furnace interior was withdrawn from duct (6) and cooled, then the dispersed phase was collected by means of a bag filter to obtain a carbon-containing mixture at a rate of 2.52 kg/H (on dry weight basis). The mixture proved to contain 59.9 wt. % carbon and 23.9 wt. % titanium (as element)(the rest being 16.0 wt. % bonding oxygen, 0.1 wt. % carbon-adhered hydrogen and not more than 0.1 wt. % others) and have a specific surface area of 73.2 $m^2/g$. The measurement of specific surface area was performed according to the BET method utilizing nitrogen gas adsorption. The ratio of titanium in the collected mixture to that in the fed TiCl$_4$ was 99.1%. (Such a ratio will hereinafter be referred to as "percent collected metal"). As a result of ESCA (electron spectro-scopy for chemical analysis), only Ti—O bond was observed as a bonding form of titanium with other element.

EXAMPLES 6–18

By using methane and hydrogen in addition to propane as the hot air fuel in Example 5 and using the metallic compounds and carbon compounds shown in Table 2, there were obtained such carbon-containing mixtures as shown in the same table. As a result of ESCA, there was obseved metal-oxygen bond in all of the Examples as a bonding form of metal with other element. As other bonding form of metal with other element, there merely was observed metal-chlorine bond in Examples 7, 11 and 14. In Examples 6 and 17 in Table 2, the metallic and carbon compounds using the same charging nozzle were mixed in advance and then fed. That is, in Example 6, (CH$_3$)$_2$SiCl$_2$ was fed through nozzle (4), while a mixture of TiCl$_4$ and xylene was fed through nozzle (5).

TABLE 2

| | Example No. | | | | | | | |
|---|---|---|---|---|---|---|---|---|
| | 6 | 7 | 8 | 9 | 10 | 11 | 12 | 13 |
| Air, Nm³/H | 75 | 75 | 75 | 50 | 50 | 50 | 50 | 100 |
| Fuel for Hot Air | | | | | | | | |
| Name | propane | propane | propane | propane | propane | methane | methane | methane |
| Nm³/H | 1 | 2 | 2 | 1 | 1 | 2 | 2 | 5 |
| Temperature at Point A, °C. | 860 | 1500 | 1500 | 1180 | 1180 | 960 | 960 | 1150 |
| Metallic Compound | | | | | | | | |
| Name | $(CH_3)_2Si$—$Cl_2$ | $TiCl_4$ | $WCl_2$ | $BCl_3$ | $AlCl_3$ | $Zr(OC_3H_7)_4$ | $HfCl_4$ | $NbCl_4$ | $Ta(OC_2H_5)_5$ |
| Kg/H | 1.27 | 1.86 | 2.40 | 2.88 | 1.23 | 3.24 | 3.34 | 2.42 | 3.46 |
| Nozzle | 4 | 5 | 4 | 4 | 4 | 4 | 4 | 4 | 4 |
| Carbon Compound | | | | | | | | |
| Name | xylene | ethanol | heavy oil A | n-hexane | benzene | benzene | benzene | n-hexane |
| Kg/H | 8.73 | 5.84 | 6.50 | 4.04 | 3.49 | 4.33 | 4.71 | 4.33 |
| Nozzle | 5 | 4 | 5 | 4 | 4 | 4 | 4 | 4 |
| Amount of Collected Mixture, Kg/H | 4.08 | 3.63 | 3.53 | 1.52 | 2.21 | 3.21 | 2.62 | 2.68 |
| Specific Surface Area of Mixture, m²/g | 40 | 29 | 102 | 51 | 74 | 62 | 48 | 140 |
| Carbon Content, wt % | 66.5 | 41.1 | 75.7 | 69.0 | 47.5 | 34.4 | 47.9 | 31.3 |
| Metal | Si | Ti | W | B | Al | Zr | Hf | Nb | Ta |
| Metal Content, wt % | 6.3 | 11.2 | 46.6 | 7.5 | 16.3 | 38.8 | 55.6 | 36.3 | 56.2 |
| Percent Collected Metal, % | 94.2 | 97.5 | 97.7 | 99.6 | 99.8 | 95.1 | 95.9 | 99.3 | 97.7 |

| | Example No. | | | | |
|---|---|---|---|---|---|
| | 14 | 15 | 16 | 17 | 18 |
| Air, Nm³/H | 100 | 75 | 75 | 75 | 75 |
| Fuel for Hot Air | | | | | |
| Name | methane | hydrogen | hydrogen | hydrogen | hydrogen |
| Nm³/H | 5 | 15 | 15 | 12 | 12 |
| Temperature at Point A, °C. | 1150 | 1310 | 1310 | 1080 | 1080 |
| Metallic Compound | | | | | |
| Name | $CrCl_4$ | $VCl_4$ | $MoCl_5$ | $(CH_3)_4Si$ | $Mg(OCH_3)_2$ | $SiCl_4$ |
| Kg/H | 6.36 | 2.15 | 6.35 | 0.83 | 0.81 | 4.34 |
| Nozzle | 4 | 4 | 4 | 4 | 5 | 4 |
| Carbon Compound | | | | | |
| Name | xylene | $C_9$ | n-hexane | ethanol | $C_9$ |
| Kg/H | 9.17 | 7.34 | 6.63 | 7.64 | 9.57 |
| Nozzle | 4 | 5 | 4 | 5 | 4 |
| Amount of Collected Mixture, Kg/H | 6.19 | 3.68 | 4.83 | 2.28 | 4.48 |
| Specific Surface Area of Mixture, m²/g | 57 | 133 | 61 | 45 | 81 |
| Carbon Content, wt % | 50.3 | 72.3 | 36.6 | 59.2 | 66.3 |
| Metal | Cr | V | Mo | Si | Mg | Si |
| Metal Content, wt % | 26.2 | 15.4 | 45.7 | 11.5 | 9.7 | 15.7 |
| Percent Collected Metal, % | 95.1 | 99.9 | 99.1 | 99.6 | 97.1 | 97.9 |

EXAMPLE 19

The mixture of the present invention obtained in Example 5 was heated at about 2,000° C. for 1 hour in an argon gas atmosphere by using a high-frequency heating furnace, then once cooled and thereafter heated to 700° C. in air to burn off the remaining carbon, yielding 5.5 g. of a finely divided titanium carbide powder. This titanium carbide powder was measured for specific surface area, which proved to be 10.2 m²/g. And its crystal form was found to be a cubic system by the powder X-ray diffraction method.

COMPARATIVE EXAMPLE 2

A commercially available industrial $TiO_2$ powder (specific surface area: 50.5 m²/g) and carbon black (specific surface area: 65.5 m²/g) were mixed in water for 2 hours by using a wet vibration mill at a weight ratio of 1:1.52 so as to give the same metal and carbon molar ratio as in Example 1, followed by drying with a spray drier to obtain a mixture of $TiO_2$ and carbon black. The mixture was heated by using a high-frequency heating furnace in just the same way as in Example 19 and thereafter the carbon was burnt off to give 5.2 g. of titanium carbide powder of a cubic system in crystal form. This titanium carbide powder was measured for specific surface area, which proved to be 0.7 m²/g.

EXAMPLE 20–29

The mixture obtained in Example 5 and used in Example 19 was substituted by the mixtures obtained in Examples 7, 8, 10–16 and 18, which mixtures were heated by using a high-frequency heating furnace under the conditions shown in Table 3 with respect to atmosphere, temperature and time, to obtain metal carbides. Then, the remaining carbon was burnt off in air at 700° C., leaving powdered metal carbides having such crystal forms and specific surface areas as shown in Table 3.

That the atmosphere in Example 25 and 26 is "in vacuo" means that heating was performed at a reduced pressure of $10^{-1}$ to $10^{-2}$ mmHg.

TABLE 3

| Example No. | Mixture | Atmosphere | Temperature °C. | Time, Hr | Carbide produced | Crystal Form | Specific Surface Area, $m^2/g$ |
|---|---|---|---|---|---|---|---|
| 20 | 3 | argon | 1600 | 2 | WC | cubic | 5.0 |
| 21 | 4 | argon | 1900 | 1 | $B_4C$ | rhomboedral | 19.1 |
| 22 | 6 | argon | 2000 | 2 | ZrC | cubic | 13.4 |
| 23 | 7 | argon | 2000 | 2 | HfC | cubic | 10.1 |
| 24 | 8 | argon | 2000 | 2 | NbC | cubic | 8.8 |
| 25 | 9 | in vacuo | 1800 | 6 | TaC | cubic | 14.1 |
| 26 | 10 | in vacuo | 1600 | 6 | $Cr_3C_2$ | needle | 17.6 |
| 27 | 11 | argon | 1200 | 9 | VC | cubic | 24.1 |
| 28 | 12 | argon | 1600 | 3 | $Mo_2C$ | hexagonal | 12.3 |
| 29 | 14 | argon | 1800 | 1 | SiC | cubic | 18.7 |

EXAMPLE 30

Using the reaction mixing furnace (300 mm dia. by 3 m long) shown in FIG. 1, air and hydrogen as a hot air fuel were fed through duct 2 and burner (3) at rates of 75 $Nm^3/H$ and 12 $Nm^3/H$, respectively, and a 1:2.2 (weight ratio) mixture of $SiCl_4$ as a silicon compound and $C_9$ as a carbon compound was fed through nozzle (4) at a rate of 14 Kg/H. The temperature in the furnace was held at 1,050-1,150° C. at the position A in FIG. 1. The aerosol formed within the furnace was withdrawn from duct (6), then cooled and thereafter passed through a bag filter to collect 4.5 Kg/H (on dry weight basis) of a mixture containing 66.3 wt. % carbon and 15.7 wt. % silicon (as element; formula weight ratio C/Si=9.9) (the rest being 17.9 wt. % bonding oxygen, 0.1 wt. % carbon-adhered hydrogen and not more than 0.1 wt. % others). As a result of ESCA, only Si—O bond was observed as a bonding from of silicon with other element.

The bulk density of the mixture taken out of the bag filter was 0.095 g/cc 40 g. of the mixture was put in a cylindrical vessel and compressed uniaxially to obtain a compressed powder with a bulk density of 0.61. The compressed powder was charged into a graphite crucible and heated at 1,600° C. for 3 hours in an argon atmosphere, then once cooled and thereafter heated in air at 750° C. to burn off the remaining carbon, yielding 8.8 g. of silicon carbide powder. As a result of X-ray diffraction spectral analysis, this powder proved to have a $\beta$ crystal form, and in an image analysis with an electron microscope it was observed that the average particle diameter of this powder was 0.19μ and that its particle and spherical.

EXAMPLES 31-34

The hydrogen used as a hot air fuel in Example 30 was substituted by methane and propane, and as silicon and carbon compounds were mixed those shown in Table 4 at the weight ratios set forth therein to thereby obtain mixtures having the formula weight ratios shown in Table 4. These mixtures in the respective amounts shown in the same Table were compressed in the same manner as in Example 30 into compressed powders having such bulk densities as set out in the same Table. The compressed mixtures were each placed in a graphite crucible and were heated at such temperatures for such time periods as shown in Table 4 in an argon atmosphere by using a high-frequency heating furnace, then once cooled and thereafter heated in air at 750° C. to burn off the remaining carbon, leaving powdered silicon carbides in such amounts as shown in Table 4. As a result of powder X-ray diffraction spectral analysis, the powders obtained in Examples 31 and 32 were of a $\beta$ crystal form, and the powders obtained in Examples 33 and 34 were of an about 10% $\alpha$ and about 90% $\beta$ crystal form and an about 3% $\alpha$ and about 97% $\beta$ crystal form, respectively.

TABLE 4

| | Example No. | | | |
|---|---|---|---|---|
| | 31 | 32 | 33 | 34 |
| Air, $Nm^3/H$ | 75 | 75 | 100 | 100 |
| Fuel for Hot Air | | | | |
| Name | propane | propane | methane | methane |
| $Nm^3/H$ | 1 | 2 | 5 | 5 |
| Temperature at Point A, °C. | 860 | 1500 | 1150 | 1150 |
| Silicon Compound | $SiCl_4$ | $CH_3SiCl_3$ | $HSiCl_3$ | $Si(OC_2H_5)_4$ |
| Carbon Compound | heavy oil A | $C_9$ | heavy oil A | n-hexane |
| Mixing Weight Ratio | 1.89 | 1.58 | 2.22 | 1.54 |
| Feed Amount, Kg/H | 15.5 | 12.3 | 2.22 | 1.54 |
| Amount of Collected Mixture, Kg/H | 4.12 | 5.23 | 7.33 | 3.72 |
| Formula Weight Ratio, C/S | 5.9 | 8.8 | 9.6 | 7.2 |
| Heated Mixture, g | 20 | 15 | 30 | 45 |
| Bulk Density of Compressed Powder | 0.33 | 0.26 | 0.46 | 0.71 |
| Heating Temperature, °C. | 1600 | 1700 | 1900 | 1800 |
| Heating Time, H | 4 | 3 | 1 | 1 |
| Amount of Silicon Carbide produced, g. | 6.1 | 3.6 | 6.8 | 18.2 |
| Average Particle Diameter, μ | 0.55 | 0.42 | 0.77 | 0.35 |

EXAMPLE 35

Using the furnace (300 mm dia. by 3 m long) shown in FIG. 1, air and hydrogen as a hot air fuel were fed through duct 2 and burner (3) at rates of 80 $Nm^3/H$ and 12 $Nm^3/H$, respectively, while a 1:1.9:0.0077 (weight ratio) mixture of $SiCl_4$ as a silicon compound, $C_9$ fraction mixture as a carbon compound $BCl_3$ as a boron compound was fed through nozzle (4) into the furnace at a rate of 14 Kg/H. The temperature in the furnace was held at 1,000-1,100° C. at the position A in FIG. 1. The aerosol formed within the furnace was withdrawn from duct (6), then cooled and thereafter passed through a bag filter to collect 5.0 Kg/H (on dry weight basis) of a carbon-containing mixture. In this mixture were contained as elements 15.8 wt. % silicon, 65.6 wt. % carbon and 0.07 wt. % boron (the rest being 18.4 wt. % bonding oxygen, 0.1 wt. % carbon-adhered hydrogen and not more than 0.1 wt. % others). The formula weight ratio C/(Si+B) was 9.6. As a result of ESCA, there were observed only Si—O and B—O bonds as bonding forms of silicon and boron with other element.

The bulk density of the carbon-containing mixture of the invention taken out of the bag filter was 0.096 g/cc. 500 g. of this mixture was placed in a cylindrical vessel and compressed uniaxially into a compressed powder with a bulk density of 0.35 g/cc. The compressed powder was put in a graphite crucible and heated heavily at 1,700° C. for 2 hours in an argon atmosphere, then once cooled and thereafter heated in air at 750° C. to burn off the remaining carbon, yielding 115 g. of a composite carbide.

As a result of ESCA, this composite carbide proved to contain Si—C and B—C bonds. Further, as a result of powder X-ray diffraction spectral analysis there were confirmed the existence of silicon carbide of a cubic system in crystal form and that of boron carbide of needle crystal, and in an image analysis with an electron microscope it was observed that the average particle diameter of the composite carbide was $0.27\mu$ and that its particle shape was uniform and spherical.

Upon chemical analysis this composite carbide proved to contain 1.6 wt. % oxygen. It was then immersed for 5 hours in an aqueous HF solution (concentration: 10 wt. %) in an amount five times by weight as large as the composite carbide, followed by filtration and drying. Then, 110 g. of the product thus obtained was put in a liter vessel, into which was then added 300 cc. of an acetone solution having dissolved therein 2.7 g. of a resorcinol-formaldehyde condensate, followed by mixing for 10 hours at room temperature. The vessel was then immersed in a constant-temperature water bath held at 70° C., and after evaporating off acetone under kneading, it was heated at 600° C. for 1 hour in a nitrogen gas atmosphere to obtain a mixture of the composite carbide and an additional carbon, of the following composition (as elements): 69.1 wt. % silicon, 30.5 wt. % carbon, 0.30 wt. % boron, 0.06 wt. % oxygen, and not more than 0.1 wt. % others. The content of element carbon was 0.89 wt. %.

100 g. of the mixture was then placed in a cylindrical vessel and compressed uniaxially at a load of 0.5 S/cm$^2$, then rubber-pressed at a hydrostatic pressure of 2 S/cm$^2$ and sintered integrally at 2,100° C. for 15 minutes in a nitrogen atmosphere of $10^{-1}$ to 1 mmHg to obtain a sintered composite carbide. The density of this sintered product was measured and found to be 3.11 g/cc, which corresponds to 97% of the theoretical density 3.21 g/cc of silicon carbide.

The sintered product was cut into 30 test pieces by means of a diamond cutter, which test pieces were measured for bending strength in accordance with JIS R-1601 ('81). More particularly, the test pieces were subjected to a three-point bending test, 15 pieces at room temperature and the remaining 15 pieces at 1,400° C. in a nitrogen atmosphere. As a result, the average bending strength at room temperature was 46 Kg/mm$^2$ and standard deviation 2.6 Kg/mm$^2$, while the average bending strength at 1,400° C. was 45 Kg/mm$^2$ and standard deviation 2.5 Kg/mm$^2$.

EXAMPLE 36

Using the furnace (300 mm dia. by 3 m long) shown in FIG. 1, air and hydrogen as a hot air fuel were fed through duct (2) and burner (3) at rates of 80 Nm$^3$/H and 12 Nm$^3$/H respectively, while a 1:1 (weight ratio) mixture of SiCl$_4$ as a silicon compound and C$_9$ fraction mixture as a carbon compound was fed through nozzle (4) into the furnace at a rate of 14 Kg/H. The temperature in the furnace was held at 1.000-1,100° C. at the position A in FIG. 1. The aerosol formed within the furnace was withdrawn from duct (5) and passed through a bag filter to collect 4.8 Kg/H (on dry weight basis) of a finely divided carbon-containing mixture, in which were contained 48.5 wt. % carbon and 24.0 wt. % silicon (as element)(the rest being 27.4 wt. % bonding oxygen, 0.1 wt. % carbonadhered hydrogen and not more than 0.1 wt. % others). As a result of ESCA, only Si—O bond was observed as a bonding form of silicon and other element. The mixture was measured for nitrogen adsorbed specific surface area in accordance with ASTM D3037-78, which specific surface area was found to be 48.5 m$^2$/g. The bulk density of the mixture taken out of a bag filter was 0.088 g/cc.

30 g. of the mixture was placed in a graphite crucible and heated at 1,600° C. for 2 hours in an argon atmosphere, then once cooled and thereafter heated to 700° C. in air to burn off the remaining carbon to obtain 9.7 g. of silicon carbide. As a result of powder X-ray diffraction spectral analysis, the silicon carbide proved to have a $\beta$ crystal form, and in an image analysis with an electron microscope there was observed only a needle-like whisker, with L/D ratio being 62. The percent conversion of the silicon in the finely divided carbon-containing mixture into silicon carbide was calculated to be 95% as element.

EXAMPLES 37-40

As the fuel for hot air in Example 36 there were used methane and propane in place of hydrogen, and as decomposable silicon compounds and carbon compounds, those shown in Table 5 were mixed at the weight ratios shown in the same Table and the resultant mixtures were fed from nozzle (4) into the furnace, then collected on bag filtrate to obtain finely divided carbon-containing mixtures having such compositions and bulk densities as set out in Table 5. Then, 30 g. of each of the mixtures thus obtained was heated at such temperature for such period of time as shown Table 6 in an argon atmosphere by using a high-frequency heating furnace in the same way as in Example 36, then once cooled and thereafter heated to 700° C. in air to burn off the remaining carbon. In this way there were obtained silicon carbides in such amounts as shown in Table 6.

As a result of powder X-ray diffraction spectral analysis, the silicon carbides were all found to be $\beta$ type in crystal form, and as a result of image observation with an electron microscope there were observed both a needle-like whisker and a particulate shape in Example 37, and only a needle-like whisker in all of Examples 38-40. The respective L/D ratios were as shown in Table 6. Further, the percent conversion of the silicon as element in each of the heated, finely divided carbon-containing mixtures into silicon carbide was as set out in Table 6.

TABLE 5

| | Example | | | |
|---|---|---|---|---|
| | 37 | 38 | 39 | 40 |
| Air (Nm$^3$/H) | 80 | 80 | 80 | 80 |
| Fuel for Hot Air | | | | |
| Name | methane | methane | propane | propane |
| (Nm$^3$/H) | 4 | 4 | 2 | 2 |
| Temperature at Point A, °C. | 1150 | 1150 | 1450 | 1450 |
| Silicon Compound (a) | SiCl$_4$ | CH$_3$SiCl$_3$ | HSiCl$_3$ | Si(OC$_2$H$_5$)$_4$ |
| Carbon Compound (b) | heavy | heavy | toluene | n-hexane |

TABLE 5-continued

| | Example | | | |
|---|---|---|---|---|
| | 37 | 38 | 39 | 40 |
| | oil A | oil A | | |
| (a/b) Mixing Weight Ratio | 1:1 | 1:1.5 | 1:2 | 1:0.8 |
| Feed Amount (Kg/H) Finely Divided Carbon-Containing Mixture | 20 | 17 | 15 | 12 |
| Collected Amount(Kg/H) | 7.2 | 6.1 | 5.8 | 4.2 |
| Composition (wt %) | | | | |
| Si | 22.7 | 18.4 | 17.7 | 21.3 |
| C | 51.2 | 60.6 | 62.0 | 54.3 |
| O | 25.9 | 20.9 | 20.2 | 24.3 |
| Bulk Density (g/cc) | 0.081 | 0.079 | 0.091 | 0.11 |
| Nitrogen Adsorbed Specific Surface Area (m$^2$/g) | 2.26 | 30.5 | 39.6 | 78.5 |

TABLE 6

| | Example | | | |
|---|---|---|---|---|
| | 37 | 38 | 39 | 40 |
| Carbon-Containing Mixture (g) | 30 | 30 | 30 | 30 |
| Heating Temperature (°C.) | 1,650 | 1,500 | 1,600 | 1,600 |
| Heating Time (H) | 1 | 5 | 2 | 3 |
| Amount of silicon carbide produced (g) | 9.2 | 7.2 | 7.3 | 8.5 |
| Yield (% as silicon) | 95 | 91 | 96 | 93 |
| L/D | 27 | 59 | 73 | 55 |

POSSIBILITY OF INDUSTRIAL UTILIZATION

As set forth hereinabove, the carbon-containing mixtures obtained according to the process of the present invention have superior characteristics as metal carbide precursors because they are highly uniform and consist mainly of fine particles. And from metal carbide powders obtained by heat treatment of those mixtures there can be produced ceramic materials of high quality. The process of the present invention can be carried out continuously and economically.

We claim:

1. A process for preparing a carbon-containing mixture comprising elemental carbon and at least a metal oxide having the molar ratio of carbon to metal in the range of 3 to 20 suitable for the preparation of a metal carbide which comprises:
   (i) introducing a decomposable carbon compound which compound is a metal-free carbon compound capable of being decomposed to elemental carbon in a hot gas and a decomposable metallic compound which compound is a metallic compound capable of being decomposed in a hot gas containing steam to produce a corresponding metal oxide, into a hot gas containing steam, said carbon compound and said metallic compound being present in an amount sufficient to obtain said carbon to metal molar ratio of 3 to 20,
   (ii) decomposing said carbon compound to elemental carbon and said metallic compound to a metallic oxide by said hot gas in the presence of said steam,
   (iii) thereby producing said solid mixture of elemental carbon and a metal oxide dispersed in a gas phase,
   (iv) collecting said dispersed solid mixture from said gas phase by solid-gas separating means.

2. A process for preparing a metal carbide from a carbon-containing mixture comprising elemental carbon and at least a metal oxide having the molar ratio of carbon to metal in the range of 3 to 20 suitable for the preparation of a metal carbide which comprises:
   (i) introducing a decomposable carbon compound which compound is a metal free carbon compound capable of being decomposed to elemental carbon in a hot gas and a decomposable metallic compound which compound is a metallic compound capable of being decomposed in a hot gas containing steam to produce a corresponding metal oxide into a hot gas containing steam, said carbon compound and said metallic compound being present in an amount sufficient to obtain said carbon to metal molar ratio of 3 to 20.
   (ii) decomposing said carbon compound to elemental carbon and said metallic compound to a metallic oxide by said hot gas in the presence of said steam,
   (iii) thereby producing said solid mixture of elemental carbon and metal oxide dispersed in a gas phase,
   (iv) collecting said dispersed solid mixture from said gas phase by solid-gas separating means,
   (v) heating said carbon containing mixture in a furnace at a temperature in the range from about 1,300° C. to about 2,400° C. to convert said carbon-containing mixture to a metal carbide.

3. The process of claim 2, wherein the metal component is silicon, titanium, tungsten, boron, aluminum, zirconium, hafnium, niobium, molybdenum, tantalum, chromium, or vanadium.

4. The process of claim 2, wherein the metal component comprises silicon and boron, where the weight ratio of boron to silicon is in the range of 0.5–4.5:100.

5. The process of claim 2, wherein said carbon-containing mixture is compressed so as to give a bulk density thereof not lower than 0.15 g/cc and is heat-treated in this compressed state to obtain said metal carbide as a finely divided powder.

6. The process claim 2 wherein said carbon centaining mixture has a bulk density below 0.15 g/cc prior to heat treatment to produce said metal carbide in wisker form.

7. The process of claim 2 wherein the metal of said decomposable metallic compound is silicon.

8. The process of claim 1, wherein said decomposable carbon compound is a compound selected from the group consisting of hydrocarbons and halogenated hydrocarbons.

* * * * *